May 1, 1928. A. G. F. KUROWSKI Re. 16,951
TYPEWRITING MACHINE
Original Filed Sept. 14, 1923
Fig. 1.
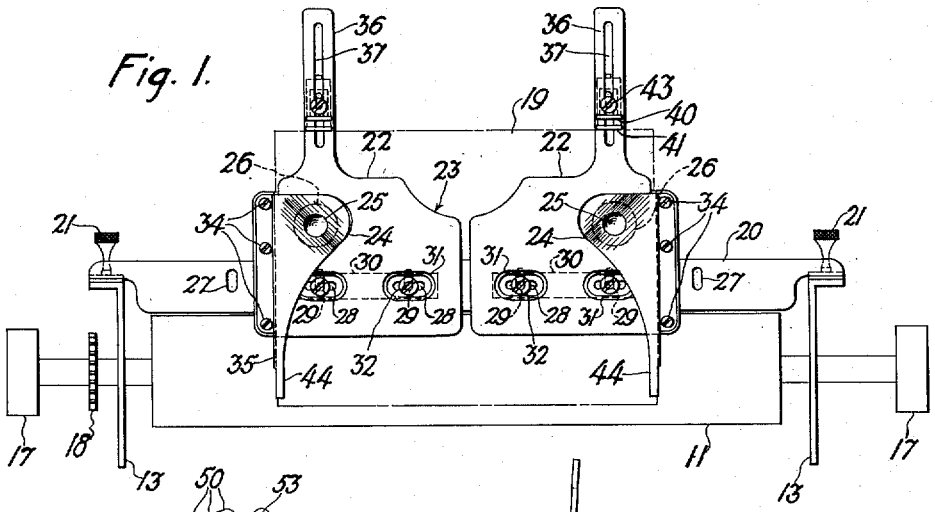
Fig. 4.
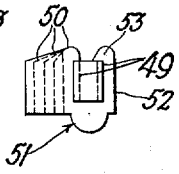
Fig. 3.
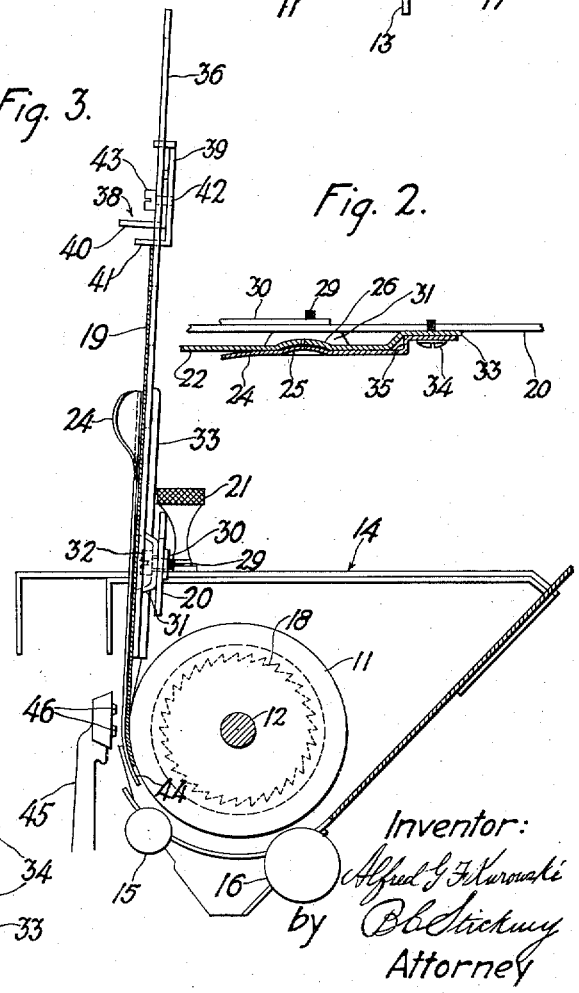
Fig. 2.
Fig. 5.
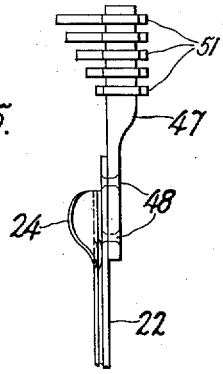
Fig. 6.
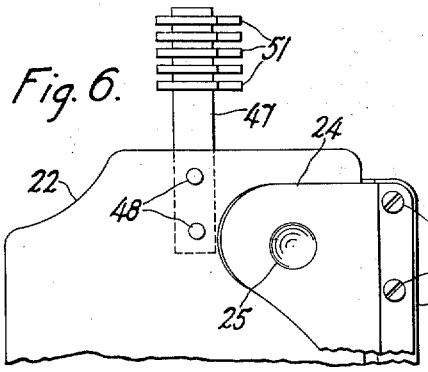
Inventor:
Alfred G. F. Kurowski
by B. B. Stickney
Attorney Reissued May 1, 1928. Re. 16,951

UNITED STATES PATENT OFFICE.

ALFRED G. F. KUROWSKI, OF BROOKLYN, NEW YORK, ASSIGNOR TO UNDERWOOD ELLIOTT FISHER COMPANY, OF NEW YORK, N. Y., A CORPORATION OF DELAWARE.

TYPEWRITING MACHINE.

Original No. 1,603,918, dated October 19, 1926, Serial No. 662,613, filed September 14, 1923. Application for reissue filed December 1, 1926. Serial No. 152,045.

This invention relates to means in typewriting machines for gaging and holding work-pieces, such as sheets, cards, or the like in position to be typed, especially near the bottom edges thereof.

According to one form of the invention, provision is made of a collating table substantially tangential to the platen at the printing line. Such table may comprise two sections or aligning plates, which may be adjustably mounted on a transverse bar on the platen-frame.

To guide to the printing line a downwardly-inserted card, provision is made of resilient plates or members, extending inwardly from the outer edges of the table, or of the aligning plates comprising the same, and serving to press the card against the table to prevent accidental displacement. Preferably the table and the resilient members are provided with depressed portions normally fitting into each other, so as to effect a suitable frictional gripping of the card.

The resilient members are flared outwardly from the table at their upper and inner portions, to facilitate the downward and sidewise insertion of a card or other work-piece. The resilient members are also utilized to gage the side edges of the card. To this end, the resilient members are provided with rearwardly-projecting flanges to form side gages, and with flanges extending outwardly from the rear edges of the side-gage portions, to provide means for fastening the resilient members to rearwardly-offset edge portions of the table. It will be evident that, with this arrangement, the cards may readily be gaged by the side-gage portions of the resilient members.

For determining the line-space position of a card or other work-piece, provision is made of longitudinally-slotted gage-bars projecting upwardly in prolongation of the sections of the table, and of two gages for each gage-bar, of which the farthest from the printing line is higher to permit the gaging thereby of a card overlying the lower gage. Preferably the gages are adjustable with respect to each other, and along said slot, and may be secured in adjusted position by suitable means, such as a screw. Obviously the number of gages may be greater than two.

According to another form of the means for gaging the line-space position of the card or other work-piece, the gage-bars are slotted at regular intervals on opposite faces to receive the forked ends of gages resembling tabulator-stops. Preferably the portions of the gages on one side of the forks are comparatively rigid and increase progressively in height, and the other portions are resilient to permit the gages to be forced into position on the bars, and hooks at the ends of the resilient portions to be snapped into locking position. It will be evident that, when this form of the invention is used, a card may be gaged to any one of a considerable number of different line-space positions.

Other features and advantages will hereinafter appear.

In the accompanying drawings,

Figure 1 is a front elevation, showing the invention applied to a portion of an Underwood standard typewriting machine.

Figure 2 is a detail sectional view, showing the arrangement of parts for gaging the side edge of a card, and for frictionally holding the same in position on the table.

Figure 3 is a side elevation, partly in section, of the same general structure shown in Figure 1.

Figure 4 is a view showing a complement of gages progressively increasing in height from front to rear.

Figure 5 is a view showing the arrangement of the gages of Figure 4 on a suitable bar connected with the collating table.

Figure 6 is a front elevation of one end of the collating table, showing a gage-bar equipped with the form of gages shown in Figures 4 and 5.

In the Underwood standard typewriting machine, a platen 11 is journaled, by means of an axle 12, in the ends 13 of a platen-frame 14, and the platen is advanced to feed work-sheets passing therebetween, and front and rear feed-rolls 15 and 16, respectively, by means of finger-wheels 17 on the ends of the axle 12, or by line-space mechanism comprising a ratchet-wheel 18.

The present invention relates to an attachment which can be applied to the structure just described, so that cards or other work-pieces 19 may be introduced bottom edge first downwardly at the front of the platen and held in position to receive typing near the bottom edges thereof. When the attachment is in use, the platen is not used in connection with the feed-rolls for feeding purposes, and the feed-rolls may, for convenience, be left in case-off position when the attachment is in use.

As herein disclosed, the attachment comprises a bar 20 attached by means of thumbscrews 21 to the ends of the platen-frame, two wing-shaped aligning plates 22 attached to the bar 20 forming a table 23, and two resilient members or plates 24, forming with the aligning plates 22 chutes to receive the edges of one of the cards 19 inserted bottom edge downwardly toward the printing line, the resilient members 24 being diagonally flared away from the aligning plates at their tops and inner edges to facilitate the insertion of the bottom edge of the card, and being provided with depressions 25 overlying corresponding depressions 26 in the aligning plates to provide suitable means for frictionally holding the card against displacement.

As shown in Figure 1, the bar 20 is provided with a plurality of vertical slots 27, and each of the aligning plates is provided with horizontal slots 28 to provide for adjustment of the aligning plates 22, which are held in position on the bar 20 by means of screws 29 extending through slots of both sets and threaded into two strips 30 extending along the backs of the aligning plates. The slots 28 are in depressed portions 31 of the plates 22 displaced rearwardly from the face of the table sufficiently to receive the heads 32 of the screws 29 without projection thereof to the plane of the face of the table.

As shown in Figure 2, each aligning plate is provided with a rearward offset 33 at its outer edge, and the outer edge of the corresponding resilient member 24 is attached thereto by screws 34, the resilient member being bent outwardly at right angles from the portion engaged by the heads of said screws, to form a side-edge gage 35, and again at right angles to cause a portion thereof to extend along the top of the corresponding aligning plate 22. It will be evident that, by the arrangement just described, provision is made of an effective side-edge gage for the corresponding edge of the card.

To provide for the proper positioning of the bottom edge of the card 19, with reference to the printing line, provision is made of gaging means to co-operate with the upper edge of the card. To this end, each aligning plate 22 is provided with an upwardly-extending gage-bar 36 which may be integral therewith. Preferably each of the gage-bars 36 is provided with a longitudinal slot 37, through which extends a portion of an L-shaped member 38, and also of a U-shaped member 39, embracing the L-shaped member at the rear of the gage-bar, and the effective portions or gages 40 and 41 of the members 38 and 39, respectively, at the front of the gage-bar, being of greater width than the slot 37 to assist in holding the gages on the gage-bar. To secure the gages 40 and 41 in adjusted position, provision is made of a screw 42, having a head 43 of greater diameter than the width of the slot 37, and passing through a slot in one arm of the L-shaped member 38 and threaded into the bridge of the U-shaped member 39, so that, upon adjusting the gages 40 and 41, with reference to each other and to the printing line, they may be secured in such adjusted positions by tightening the screw 42. As shown in Figure 3, the gaging portion 40 of the L-shaped member 38 is of greater height than the gaging portion 41 of the U-shaped member 39, so that the top edge of the card may be gaged against the gaging portion 41 of said U-shaped member, or may extend over the same and be gaged by the gaging portion 40 of the L-shaped gage-member.

In practice, the gages 40 and 41 and the aligning plates 22 are adjusted in position for a predetermined size of card 19. One of the cards 19 is then inserted from above and passed downwardly to the printing line, as indicated in Figure 1, the side edges of the card being held in position against the platen 11 by downwardly-extending fingers or extensions 44 of the resilient members 24. The upper edge of the card is then gaged against one of the two gages 40 and 41, and thereby positioned to be typed upon by means of type-bars 45 and types 46 thereon. After the typing on the card is completed, the card is removed or line-spaced by moving it to position against the other gage, and the operation may be repeated as many times as required by the entries to be made on the same or different cards.

In the modified form of gaging means, shown in Figures 4, 5 and 6, disclosure is made of means for gaging a card 19 in a greater number of positions to receive typing. To this end, provision is made of gage-bars 47, which are not integral with the aligning plates 22 but are secured thereto by suitable means, such as rivets 48; and the bars 47 are provided with notches 49 at regular intervals at opposite sides thereof, so that the notches 49 on one side of each bar 47 may be used to receive stiff gaging portions 50 of the set of gages 51, and the notches 49 on the other side of the bar may receive resilient fingers 52, which are provided with hooks 53 at their ends to snap over the edge of the bar to hold the gages thereon.

The invention is not limited to use with cards only, as it is obvious that any other kind of work-pieces, such as ordinary work-sheets, bills or the like, may be brought to position against the gages and line spaced in the same manner as the cards.

Variations may be resorted to within the scope of the invention, and portions of the improvements may be used without others.

Having thus described my invention, I claim:

1. In a typewriting machine, a platen, and means for positioning and holding a card to receive typing adjacent the lower edge thereof, comprising a table to support the card for contact with the platen at the printing line, and resilient clips overlying said table and attached to the edges of the table, said resilient clips extending forwardly at right angles to form gages for the sides of the card, and then inwardly over the table to clamp the card thereagainst, said table having depressions and said clamps having corresponding protuberances tending to force the work into the depressions, thereby holding the card frictionally.

2. In a typewriting machine, a platen, and means for positioning and holding a card to receive typing adjacent the lower portion thereof, comprising a table to support the card for contact with the platen at the printing line, resilient members extending inwardly from the edges of the table, to gage the side edges of the card and to press the same against the platen, and a plurality of adjustable devices for selectively gaging the upper edge of the card to determine the spacing for lines of typing to be written upon the lower portion of the card, said devices being fixed during all of such gaging operations.

3. In a typewriting machine, a platen, and means for positioning and holding a card to receive typing adjacent the lower edge thereof, comprising a table to support the card for contact with the platen at the printing line, means to press the card against the platen, and a plurality of adjustable stops of graduated heights for varying the gaging of the upper edge of the card to position the card to receive typing on different lines, said stops being fixed during all of such gaging operations.

4. In a typewriting machine, a platen, and means for positioning and holding a card to receive typing adjacent the lower edge thereof, comprising a table to support the card for contact with the platen at the printing line, resilient members extending inwardly from the edges of the table, to gage the side edges of the card and to press the same against the platen, and means for gaging the upper edges of said card to different positions, comprising a gage-bar and a plurality of gages increasing in height away from the printing line, so that the upper edge of the card may extend over a lower gage to co-operate with a higher gage.

5. In a typewriting machine, a platen, a table at the delivery side of the platen, a plurality of gage-bars extending in prolongation of said table, and a plurality of top-edge gages adjustable along said gage-bars, said top-edge gages increasing progressively in height away from the printing line, to permit the use of any one thereof to gage a work-sheet overlying all gages shorter than the one in use.

6. In a typewriting machine, a platen, a table at the delivery side of the platen, comprising two plates adjustable with respect to each other longitudinally of the platen, a gage-bar on each of said plates, and a plurality of gages at line-space intervals adjustable as a unit on each of said gage-bars and against which the top edge of a work-piece may be selectively positioned whereby to control the placement of lines to be typed upon the lower portion of said work-piece.

7. In a typewriting machine, a platen, a paper-table associated therewith, and rising vertically from the front of the platen, and means to hold a work-sheet fixed in flat vertical condition on said table against accidental displacement, during the typing of a line on the bottom edge of the sheet, comprising a depression in said table, and a resilient member including a rearward projection to fit into said depression, a work-sheet being gripped between the depression and the projection, said resilient member being open at the top to permit downward insertion of the work-sheet between the same and the table.

8. In a typewriting machine, a platen, a paper-table associated therewith, and rising vertically from the front of the platen, and means to hold a work-sheet fixed in flat vertical condition on said table against accidental displacement, during the typing of a line on the bottom edge of the sheet, comprising a shallow cup-shaped depression in said table, and a resilient member to press the work-sheet against the table, said resilient member having a rearward projection to enter said depression, said rearward projection resulting from the formation of a cup-shaped depression in the outer face of the resilient member, said resilient member being open at the top to permit downward insertion of the work-sheet between the same and the table.

9. In a typewriting machine, a platen, a work-sheet guide associated therewith, and means including a plurality of stops extending forwardly adjacent the delivery side of the platen and increasing progressively in height, for gaging a work-sheet to corresponding line-space positions.

10. In a typewriting machine, the combination with a platen, of a plurality of gaging devices extending forwardly adjacent the delivery side of said platen and arranged in echelon and against which the upper edge of a work-piece may be progressively positioned whereby to line-space the work-piece, said devices being adjustable relatively to one another and to the printing line.

11. In a typewriting machine, the combination with a platen and a platen-frame, of means attached to said platen-frame locating a work-piece with the lower portion thereof exposed to the types at the printing line, including chutes guiding the side edges of the work-piece as it is moved downwardly at the delivery side of the platen, clamping members engaging the work-piece, and means for gaging the line-space positions of the work-piece, comprising a plurality of gages arranged in echelon against any one of which the work-piece may be successively positioned, said clamping members holding said work-piece in gaged position during typing.

12. In a typewriting machine, the combination with a platen, of a chute for guiding to the printing line a work-piece inserted bottom edge downward at the front of the platen, said chute including a rear wall and a front wall unconnected at the top of the chute, the walls having interlocking depressions for indenting the work-piece, whereby to hold the same within the chute, said front wall at its top being resilient and flaring and separable from the rear wall by thrusting therebetween the lower edge of a card extending above said chute.

13. In a typewriting machine, the combination with a platen, of a chute for guiding to the printing line a work-piece inserted bottom edge downward at the front of the platen, said chute including a rear wall and a resilient front wall unconnected at the top of the chute, said rear wall having a depression therein, said front wall having a corresponding depression projecting within said first-named depression, whereby the work-piece is slightly indented and thereby secured within the chute, said front wall at its top being resilient and flaring and separable from the rear wall by thrusting therebetween the lower edge of a card extending above said chute.

14. In a typewriting machine, the combination with a platen, of a chute for guiding to the printing line a work-piece inserted bottom edge downward at the front of the platen, said chute including plates at the front and the rear of the work-piece, the front plates having the upper edges thereof turned outward to provide a lip for easy insertion of the work-piece, said plates each including complementary depressions beneath said lip, for indenting the work-piece, whereby to hold the same within the chute, and gaging means only above the chute for locating the bottom edge of the work-piece at the printing line; said chute being open at its top below said gaging means for the downward insertion of the work-piece.

15. In a typewriting machine, the combination with a platen, of a chute for guiding to the printing line a work-piece inserted bottom edge downward at the front of the platen, said chute including an adjustable work-table adjacent each side of the work-piece, each table having a depression therein, guides for the side edges of the work-piece, and resilient plates overlying the work-tables, said resilient plates having depressions fitting into said first-named depressions, for indenting the work-piece, whereby to hold the same within the chute, and gaging means only above the chute for locating the bottom edge of the work-piece at the printing line; said chute being open at its top below said gaging means for the downward insertion of the work-piece.

16. In a typewriting machine, the combination with a platen, and a platen-frame therefor, including side frames, of a bar extending across the platen and detachably mounted on said side frames, a pair of work-tables slidably adjustable upon said bar, guides carried by the tables for the side edges of a work-piece, and resilient clips overlying said tables, whereby to grip said work-piece, each table having a staff provided with an adjustable gage, said gage spaced far above the clip, and the clips being open for the downward insertion of a card therein.

17. In a typewriting machine, the combination with a platen, and a platen-frame therefor, including side frames, of a support detachably mounted on each of the side frames, a bar extending along the platen and adjustably attached to said supports, a pair of work-tables slidably adjustable upon said bar, guides carried by the work-tables for the side edges of a work-piece, resilient clips overlying said tables and including means for gripping the work-piece, and permanently fixed gages at line-space intervals for mechanically gaging the top edge of the work-piece selectively in a succession of predetermined positions, whereby to bring the bottom portion of said work-piece selectively to successive line-space positions at the printing line of the platen.

18. In a typewriting machine, the combination with a platen, of a work-table, guides carried by the work-table for the side edges of a work-piece, resilient clips overlying said table and including means for gripping the work-piece, and a series of permanently fixed selective stepped gage-means spaced at line-space intervals for the top edge of the work-piece, whereby to progressively line-space the bottom of said work-piece selectively.

19. In a typewriting machine, the combination with a platen, and a platen-frame including side frames, of a bar detachably secured to said side frames, and extending along the platen adjacent the top thereof, adjustable guides carried by said bar for the reception of a work-piece inserted bottom edge downward at the front of the platen, and a series of gage-means in stepped arrangement at line-space intervals against which the top edge of the work-piece may be successively positioned selectively, whereby to line-space the bottom of said work-piece.

20. In a typewriting machine, the combination with a platen, of a bar attached to the machine adjacent the top of the platen, paper-tables mounted on said bar and including side-edge gages for a work-piece inserted bottom edge downward at the front of the platen, top-edge gages on said tables for locating the bottom edge of a card at the printing line, and resilient clips carried by said tables including downwardly-extending fingers and at their tops disconnected from said tables, said fingers extending downward to points adjacent the printing line of the platen, whereby to hold said work-piece thereagainst, said clips including depressions directed inward toward said tables, the latter having complemental depressions into which said first-named depressions project, whereby to indent the work-piece and thereby hold the same to said tables, each clip flaring at its upper portion and separable from the tongue by thrusting therebetween the lower edge of a card extending above said clip.

21. In a typewriting machine, the combination with a platen, and a platen-frame therefor, including side frames, of a bar extending across the platen and detachably mounted on said side frames, a pair of work-tables slidably adjustable on said bar, guides carried by the tables for the side edges of a work-piece, vertically adjustable gages on said tables for the top edge of the work-piece, said gages being the sole means for locating the bottom edge of the work-piece at the printing line, and resilient clips below said gages and overlying said tables, said clips open at the top for the downward insertion of the card, and including cup-shaped depressions therein, said tables having corresponding cup-shaped depressions into which said first-named depressions project, whereby the work-piece is slightly indented and thus held against downward displacement during the typing operation.

22. In a typewriting machine, the combination with a platen, of a work-table for guiding to the printing line a work-piece inserted bottom edge downward at the front of the platen, means above said table for solely locating the bottom edge of the work-piece at the printing line, said work-table including tongues whereby to support the work-piece from the back thereof, and resilient clips below said gages and overlying said table, said clips open at the top for the downward insertion of the card, and including fingers extending downward to points adjacent the printing line of the platen and directed inward toward said platen, so as to hold the bottom edge of the work-piece thereagainst, said clips opened from their upper ends and having cup-shaped depressions therein, said tables having complementary depressions into which said first-named depressions extend, the depressions being effective to indent said work-piece and thereby hold the same against displacement during a typing operation.

23. In a typewriting machine, the combination with a platen, of a chute for guiding to the printing line a work-piece inserted bottom edge downward at the front of the platen, said chute including a pair of tables separately adjustable to the width of the work-piece, adjustable gages, one upon each table, for the upper edge of said work-piece, said gages constituting the sole means for locating the bottom edge of the work-piece at the printing line, and including a plurality of stops against which the upper edge of said work-piece may be progressively positioned selectively, to line-space the bottom of the work-piece, and means above the printing line for preventing downward displacement of the work-piece at the typing operation.

24. In a typewriting machine, the combination with a platen, of a work-holder mounted adjacent the front of the platen and including a vertical work-table, means above the printing line for holding a work-piece vertically on the work-table, gage-bars extending upwardly from the work-table, and means adjustable on the gage-bars for locating the work-piece by its upper edge in proper position for typing upon the lower edge, and for mechanically determining successive line-spacing positions thereof when said means has been fixed in adjusted position.

25. In a card-typing mechanism, the combination with typing instrumentalities, a front-strike platen, and a platen-frame, of a support extending along the platen upon said platen-frame, a pair of opposed elements extending up from the platen at the delivery side thereof and co-operative to form a top-insertion unitary card-holder, said elements having gaging means, including adjustable side-gaging and also adjustable vertically-gaging means, said card-holder arranged above the printing line and formed to hold a card in position on the platen to receive a line of typing along its lower edge, said elements being adjustable towards and from each other upon said support, and having opposite side gages for the card, each element also having a rear support for the card, and a front-plate portion being included in each element and extending in front of the card down to a point close to the printing line to confine the card, each rear support including an upwardly-extending staff, each staff having an adjustable gage thereon for the top edge of the card, for finally gaging or positioning the bottom edge portion of the card at the printing line, said rear support and said front plate forming an open chute for the downward insertion of a card therein, said staff-gages spaced well above the mouth of said chute, leaving said mouth entirely clear and accessible for the downward insertion of a card therein.

26. In a typewriting machine, a platen and means for positioning and holding a card to receive typing adjacent the lower edge thereof, including table-devices above the printing line for supporting the card for contact with the platen at the printing line, gages extending forwardly from said table-devices for the opposite side edges of the card, means extending inwardly from said side gages over the card to retain the same against the platen, and staffs extending upwardly from said table-devices and having adjustable stops thereon for gaging the top edge of the card for receiving type impressions at the bottom edge portion thereof, said card-retaining devices co-operating with the side gages and with the table-devices to form a chute permanently open at the top for the downward insertion of the card thereinto, said top gages being spaced above said chute to render the same accessible and permit the free insertion of the card downwardly therein.

27. In a typewriting machine, a platen, a table erected on edge at the delivery side of the platen, means extending down to the platen for co-operating with said table to form a card chute and including means whereby the card is gaged by its side edges and also including means whereby the card is retained against the platen, said chute permanently open at the top, a plurality of staffs extending upwardly from said table, and top edge gages adjustable up and down said staffs and spaced above said chute sufficiently to permit the free downward insertion thereinto of a card placed between the chute and the gages.

28. In a typewriting machine, a platen, a table erected on edge at the delivery side of the platen, means extending down to the platen for co-operating with said table to form a card chute and including means whereby the card is gaged by its side edges and also including means whereby the card is retained against the platen, said chute permanently open at the top, a plurality of staffs extending upwardly from said table, and top edge gages adjustable up and down said staffs and spaced above said chute sufficiently to permit the free downward insertion thereinto of a card placed between the chute and the gages, said table including two plates adjustable relatively to each other longitudinally of the platen, each plate being provided with one of said staffs.

29. In a typewriting machine, the combination with a platen, of a work-table for supporting a work-piece in printing position before the platen, a gage-support extending upwardly from the work-table, adjustable gaging means mounted on the gage-support, said adjustable gaging means including a forwardly-extending gage for the upper edge of the work-piece, and also including a lower gage terminating short of the forward edge of said first-mentioned gage, with which gages the leading edge of the work-piece may be selectively aligned, whereby line-spacing adjustment of the work-piece may be effected.

30. In a typewriting machine, the combination with a platen, of means for supporting a work-piece in position for typing adjacent the platen, adjustable gages for locating the work-piece in predetermined position, and auxiliary gages carried by the adjustable gages and spaced therefrom to permit the work-piece to be set at different line-space positions selectively.

31. An attachment for a typewriting machine including a work-table, means to hold a work-piece on the work-table in position for typing adjacent its bottom edge, stops to engage one horizontal edge of the work-piece to locate it in predetermined position, said stops being adjustable toward and away from the printing line, and other gages adjustable with said stops and located a line-space therefrom, to permit line-spacing adjustment of the work-piece by using the stop and gage selectively.

32. In a typewriting machine, the combination with a platen, of a front paper-chute associated therewith, and means on said chute fixed with relation thereto for clamping a work-sheet in position, said chute being open at the top, said chute and said clamp permitting downward insertion and positioning of said work-sheet in front of the platen, said clamp being effective to engage the work sheet concurrently with the positioning thereof in the chute.

33. In a typewriting machine, the combination with a platen, of a front paper-chute associated therewith, and means on said chute fixed with relation thereto for clamping a work-sheet in position, said chute being open at the top, said chute and said clamp permitting downward insertion and positioning of said work-sheet in front of the platen, said clamp being formed of the body of the chute and effective to engage the work-sheet concurrently with the positioning thereof in the chute.

34. In a typewriting machine, the combination with a revoluble platen and a platen-frame, of means mounted on the platen-frame wholly at the delivery side of the platen, for presenting stiff work-pieces of various heights to the front of the platen and holding each to the platen, including a work-table for supporting the work-piece in printing position before the platen, said work-table having means in front of the work-piece to confine the latter to the platen, a gage-support extending upwardly from the work-table, widely adjustable gaging means mounted on the gage-support, said adjustable gaging means including a forwardly-extending abutment for the upper edge of the work-piece, and line-space gaging means below said abutment with which the leading edge of the work-piece may be selectively aligned, said line-space gaging means being adjustable for different heights of cards.

35. In a typewriting machine, the combination with a revoluble platen and a platen-frame, of means mounted on the platen-frame wholly at the delivery side of the platen, for presenting stiff work-pieces of various heights to the front of the platen and holding each to the platen, including a work-table for supporting the work-piece in printing position before the platen, said work-table having means in front of the work-piece to confine the latter to the platen, adjustable gages for locating the work-piece in predetermined positions, and auxiliary line-space gages carried by the adjustable gages, to aid in line-spacing the work-piece by setting it to different positions relatively to the predetermined position.

36. In a typewriting machine, the combination with a revoluble platen and a platen-frame, of means mounted on the platen-frame wholly at the delivery side of the platen, for presenting stiff work-pieces of various heights to the front of the platen and holding each to the platen, including a work-table having means to confine the work-piece to the platen for typing the work-piece adjacent its bottom edge, stops to engage one horizontal edge of the work-piece to locate it in predetermined positions, said stops being adjustable toward and away from the printing line, and other line-space gages below said stops and adjustable therewith towards and away from the printing line.

ALFRED G. F. KUROWSKI.